May 29, 1962 W. NICHOLAS 3,036,628
PROJECTION SCREEN
Filed Aug. 17, 1956 5 Sheets-Sheet 1
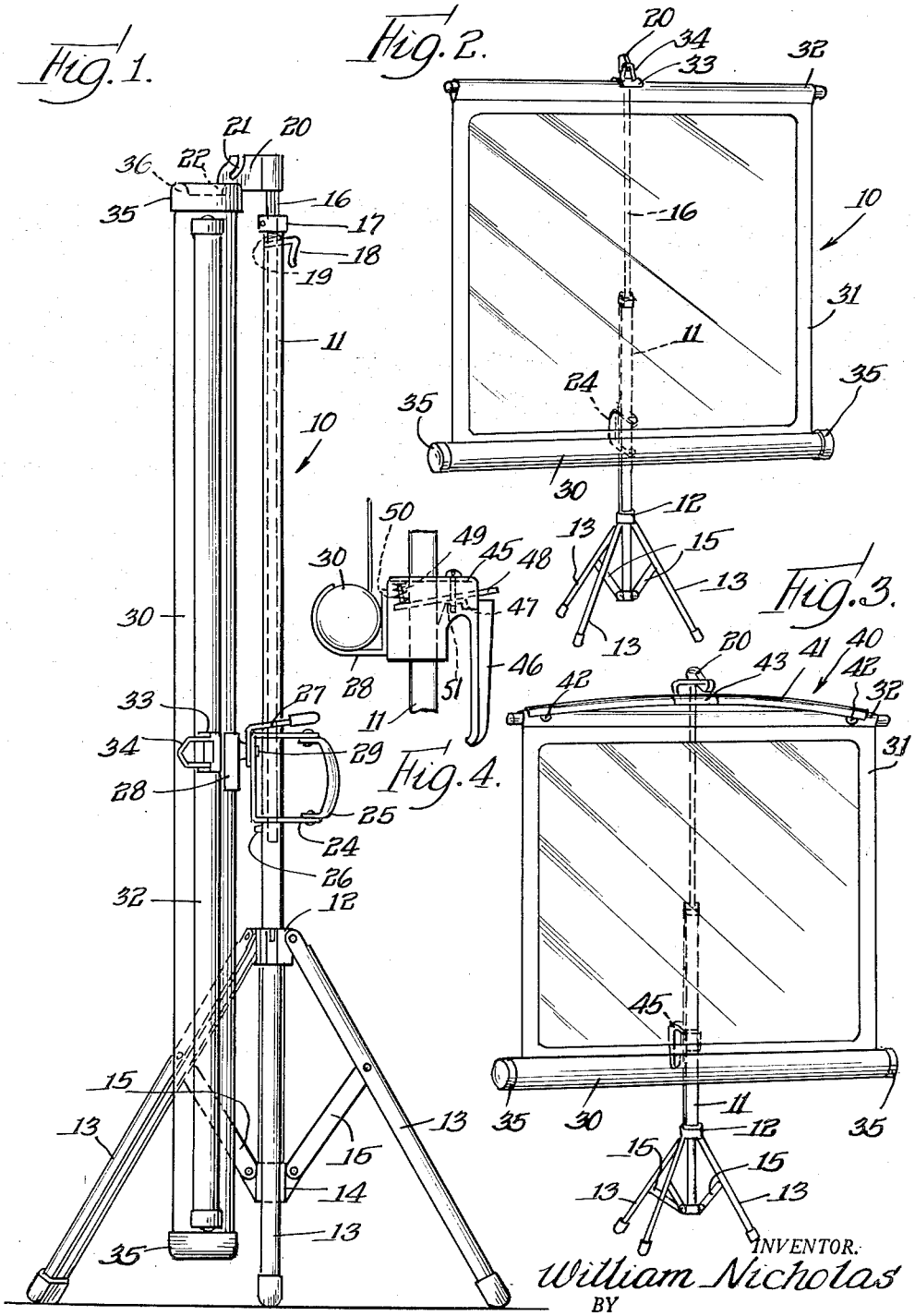
INVENTOR.
William Nicholas
BY

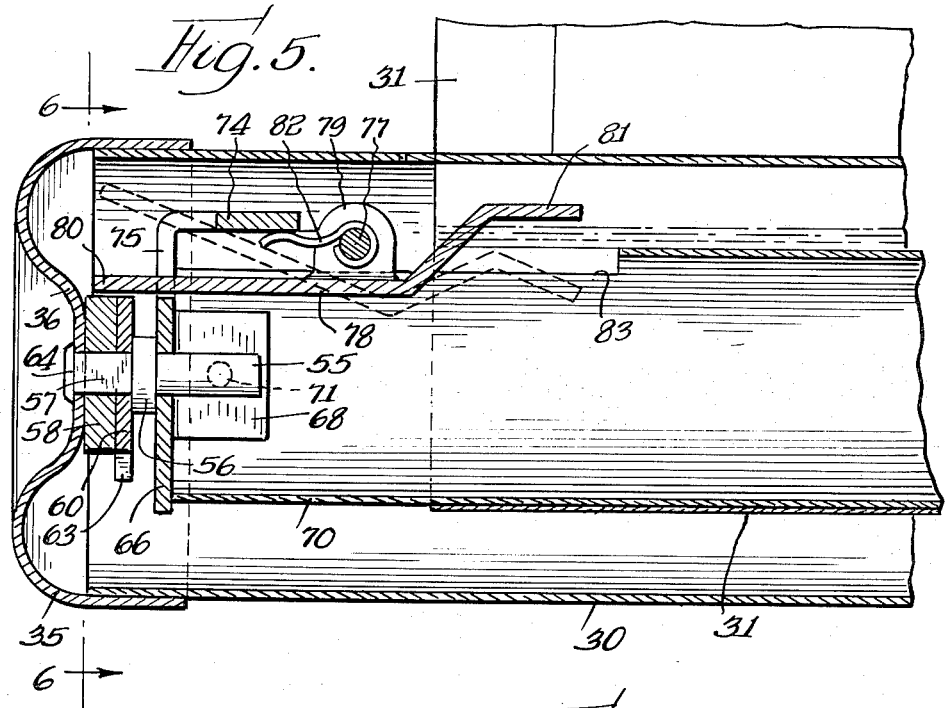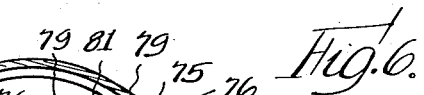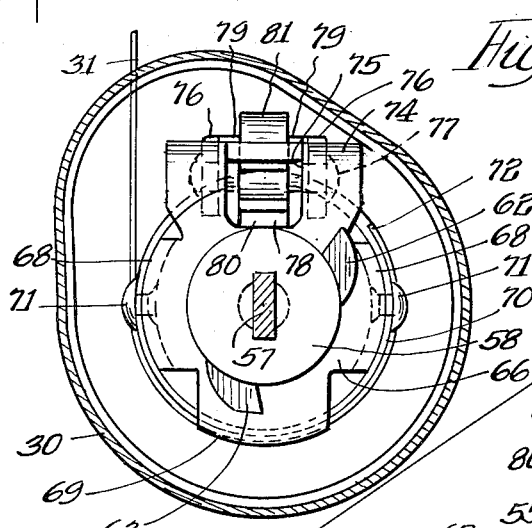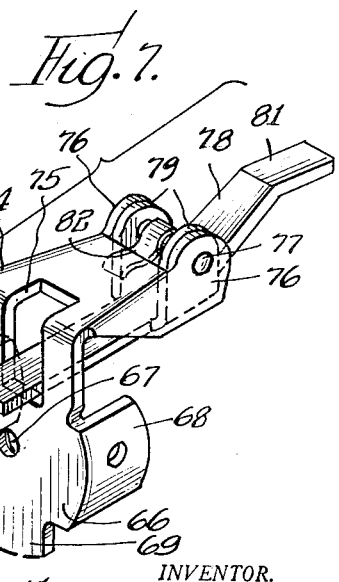

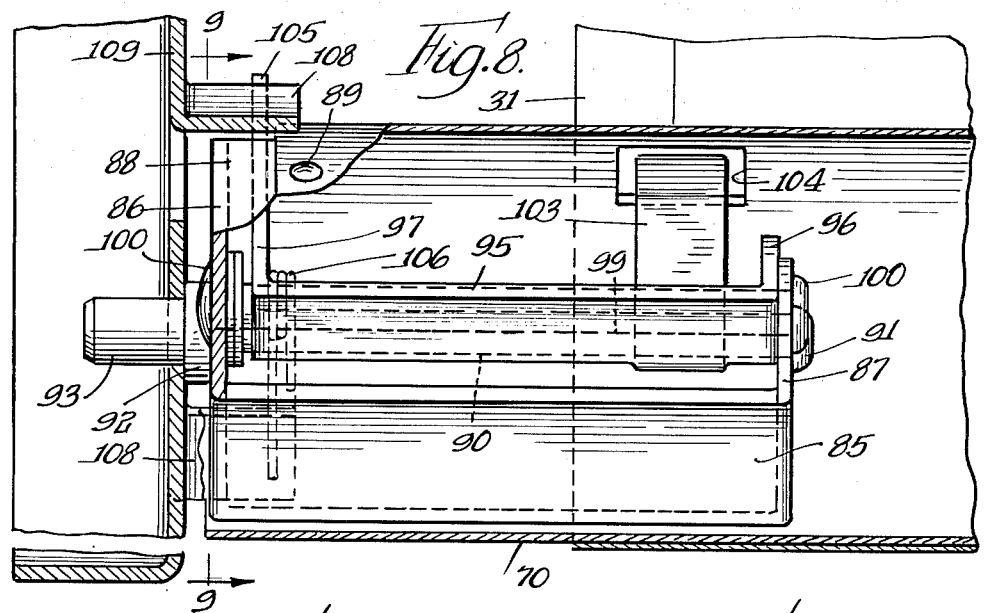
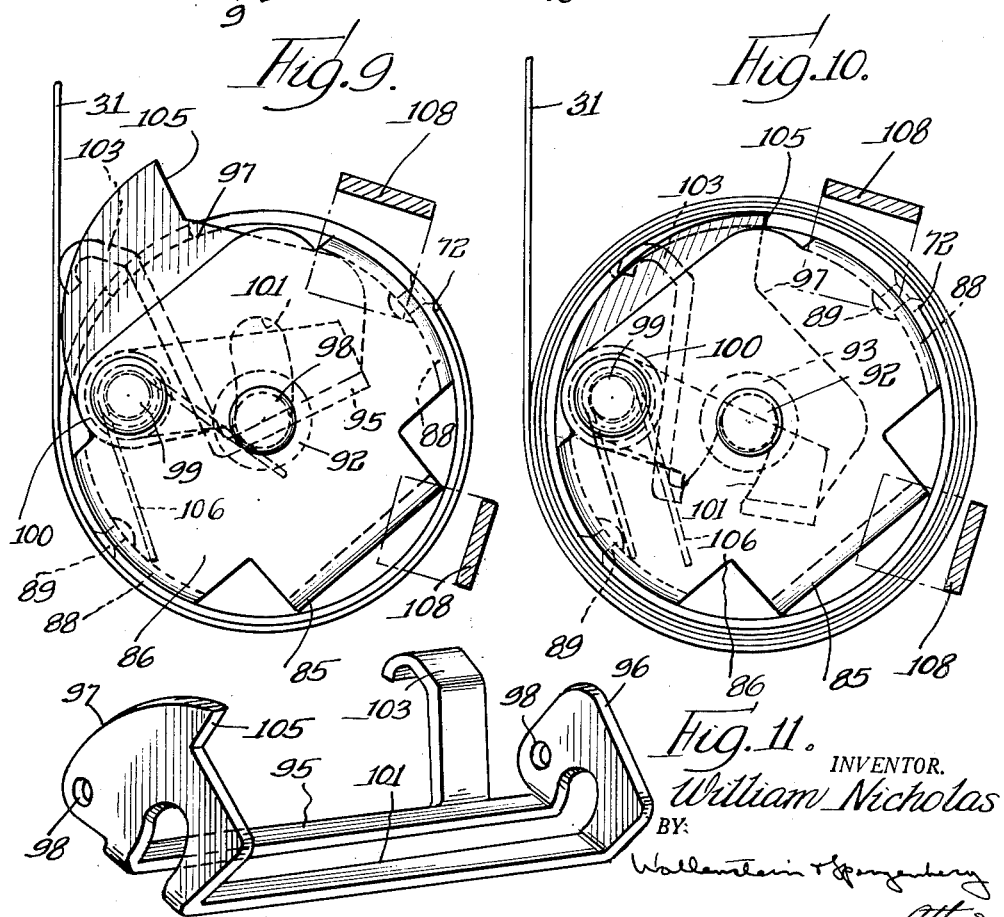

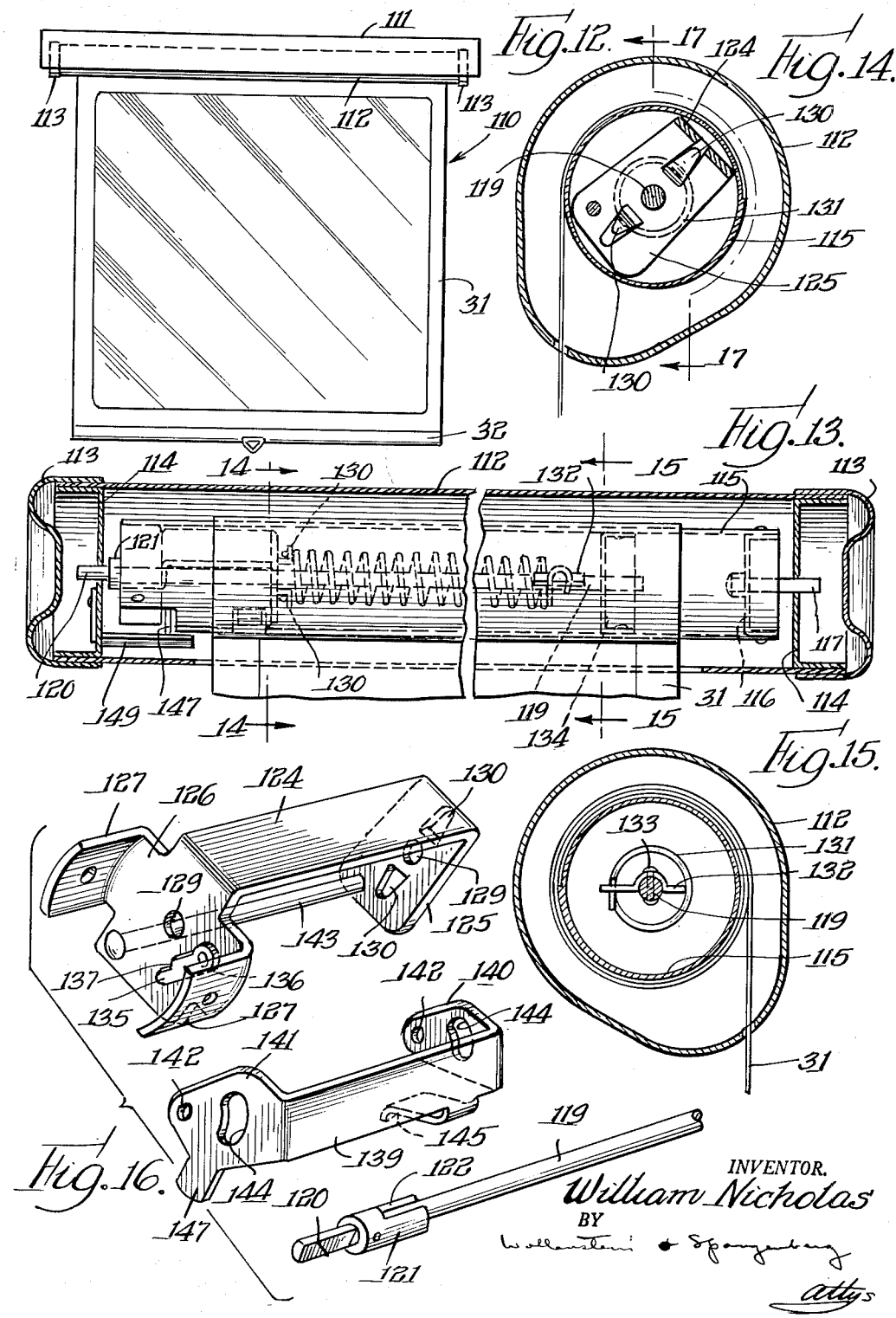

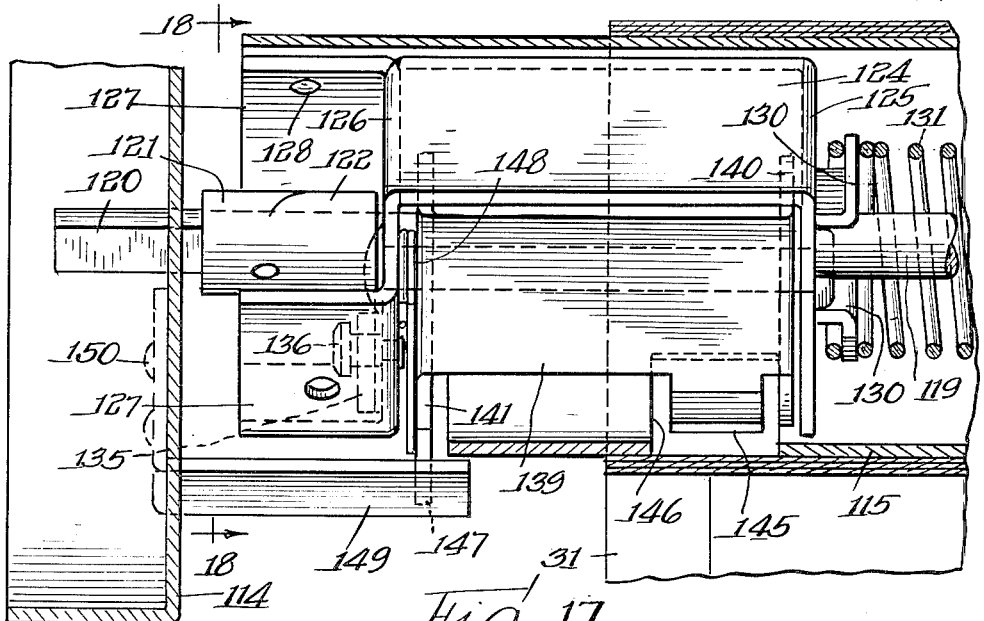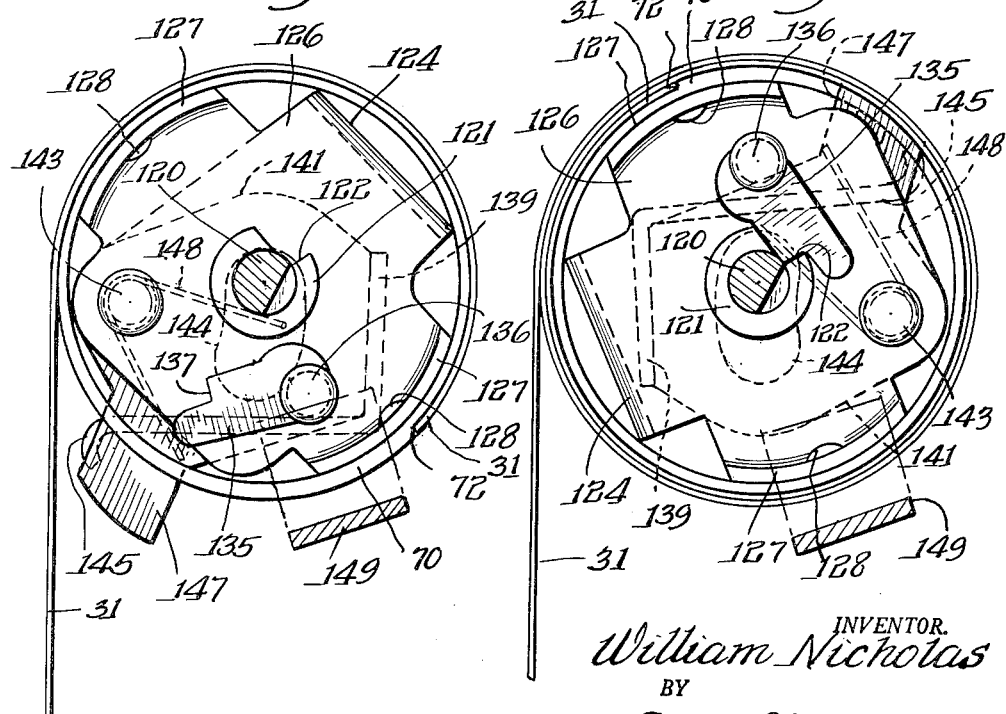

United States Patent Office 3,036,628
Patented May 29, 1962

3,036,628
PROJECTION SCREEN
William Nicholas, Evanston, Ill., assignor to Radiant Manufacturing Corporation, Chicago, Ill., a corporation of Illinois
Filed Aug. 17, 1956, Ser. No. 604,790
13 Claims. (Cl. 160—24)

This invention principally relates to projection screens for use in exhibiting pictures projected thereon.

The principal object of this invention is to provide an improved projection screen wherein unrolling of a flexible screen from its carrying roller is positively limited so as to prevent tearing or separation of the screen from the roller, wherein the means for positively limiting the unrolling of the screen cooperates, in one form of this invention, with a tensioning means for tensioning the flexible screen in picture exhibiting position to adapt it for use in exhibiting three-dimensional pictures, and wherein the means for positively limiting the unrolling of the screen cooperates, in another form of this invention, with means for maintaining the screen in picture exhibiting position to adapt it for use at a wall mounted type of projection screen.

Further objects of this invention reside in the details of construction of the improved projection screen and in the cooperative relationships between the component parts thereof.

Other objects and advantages of this invention will become apparent to those skilled in the art upon reference to the accompanying specification, claims and drawings in which:

FIG. 1 is a side elevational view of one form of the projection screen of this invention with the legs of the supporting stand extended and with the screen case vertically arranged;

FIG. 2 is a perspective view of the projection screen with the screen case horizontally arranged and with the flexible screen extended to picture exhibiting position;

FIG. 3 is a view similar to FIG. 2, but illustrating another form of the invention wherein the flexible screen is tensioned so as to provide a flat surface for the projection of three-dimension pictures;

FIG. 4 is an enlarged partial view of the handle member which may be utilized in the form of the invention illustrated in FIG. 3 and which may be of the type shown and described in my co-pending application Serial No. 418,946 filed March 26, 1954, now Patent No. 2,812,808, issued November 12, 1957;

FIG. 5 is an enlarged sectional view of a portion of the projection screen illustrated at the left hand side of FIGS. 2 and 3;

FIG. 6 is a vertical sectional view taken substantially along the line 6—6 of FIG. 5;

FIG. 7 is an exploded perspective view of a portion of the mechanism illustrated in FIGS. 5 and 6;

FIG. 8 is an enlarged sectional view of another form of this invention which may be contained in the left hand portion of the projection screen illustrated in FIGS. 2 and 3;

FIG. 9 is a vertical sectional view taken substantially along the line 9—9 of FIG. 8 and illustrating the projection screen unrolled to the last turn;

FIG. 10 is a sectional view similar to FIG. 9 but illustrating the projection screen rolled for several turns upon the roller;

FIG. 11 is a perspective view of a portion of the mechanism utilized in FIGS. 8 to 10;

FIG. 12 is an elevational view of another form of this invention, particularly a projection screen of the wall mounted type;

FIG. 13 is a vertical sectional view through the projection screen illustrated in FIG. 12;

FIG. 14 is a vertical sectional view taken substantially along the line 14—14 of FIG. 13;

FIG. 15 is a vertical sectional view taken substantially along the line 15—15 of FIG. 13;

FIG. 16 is an exploded perspective view of a portion of the mechanism illustrated in FIGS. 13, 14 and 15;

FIG. 17 is an enlarged vertical sectional view of the left hand portion of FIG. 13;

FIG. 18 is a sectional view taken substantially along the line 18—18 of FIG. 17 and showing the flexible screen unrolled to the last turn;

FIG. 19 is a sectional view similar to FIG. 18 but illustrating the flexible projection screen rolled on the roller for several turns.

Referring first to FIGS. 1 and 2, one form of the projection screen of this invention is generally designated at 10. It comprises a portable collapsible stand having an upright tube or post 11, which is preferably non-circular in cross-section. A bracket 12 is slidably carried on the upright tube 11 and a plurality of legs 13 are pivotally secured to the bracket 12. Fixed to the bottom of the upright tube 11 is a bracket 14 and links 15 are pivotally secured to the bracket 14 and to the legs 13. The legs 13 may be folded together for transportation purposes and when this is done the bracket 12 slides upwardly on the tube or post 11. Suitable latch means (not shown) may be provided for holding the legs 13 in collapsed position. When the legs are extended for exhibiting purposes, as illustrated in FIGS. 1 and 2, the bracket 12 slides downwardly on the upright post 11. In this way the supporting stand is maintained in an upright position.

An extension rod 16 is slidably mounted in the upright tube or post 11, the extension rod being guided for vertical movement by a collar (not shown) carried on the lower end of the extension rod and by a cap 17 carried on the upper end of the post 11. The extension rod 16 is maintained in any desired extended position by a nipping lever 18 extending through a suitable opening in the upright tube 11 and gripping the extension rod 16. The nipping lever is resiliently urged into gripping position by means of a spring 19 and the action of the spring may be overcome by manually manipulating the nipping lever 18 to allow desired adjustment of the position of the extension rod 16. The upper end of the extension rod 16 carries a bracket 20 having a hook portion 21 and a projection 22. There is thus provided a hook member which is slidably and adjustably carried by the post. A handle member 24 having a handle portion 25 is slidably carried on the upright tube or post 11. Downward movement of the handle member 24 is limited by a pin 26 carried by the post 11. A resilient nipping lever 27 is carried by the handle member 24 and operates to grip the post 11 for maintaining the handle member in any desired position above the pin 26. By manipulating this nipping lever 27 the handle member 24 may be adjustably positioned along the post 11. A bracket 28 is pivotally mounted to the handle member 24 as indicated at 29 and this bracket member carries a screen case 30 which is internally provided with a spring actuated roller. One end of a flexible projection screen 31 is secured to the roller within the screen case 30 and the other end is provided with a suspension slat 32. The flexible screen 31 may be provided with any suitable picture projecting surface such as a beaded surface where motion pictures are to be exhibited, or an aluminum type surface where color pictures are to be exhibited. A bracket 33 is secured to the suspension slat 32 and it is provided with a bale 34 for the purpose of withdrawing the screen 31 from the screen case 30 and for hooking over the hook member 20 to hold the flexible screen in picture exhibiting position as illustrated in FIG. 2. The ends of the screen case 30 are closed with end caps 35, at least one of which is provided with a depression 36 for receiving the projection 22 on the hook member for locking the screen case in parallel relation to the post 11, as illustrated in FIG. 1.

The type of projection screen thus far described is suitable for normal exhibiting of pictures projected thereon. However, where an extremely flat surface is required, as for the protection of three-dimensional pictures, a somewhat different arrangement may be utilized, such arrangement being generally designated at 40 in FIG. 3. Here a resilient means in the form of an elongated spring member 41 is secured at its ends to the suspension slat 32 as indicated at 42. This spring member 41 is provided with a bracket 43 which carries a bale 44 which is adapted to be hooked over the hook member 20. This resilient means, including the spring member 41, is utilized for the purpose of tensioning the flexible screen 31 to provide an extremely flat surface. In order to prevent the screen case from moving upwardly, under the tensioning afforded by the spring member 41, a handle member 45 may be utilized, and this handle member 45 may be of the type shown and described in my co-pending application Serial No. 418,946, filed March 26, 1954. This handle member 45 is illustrated in more detail in FIG. 4. Here, the handle member 45 is slidably mounted on the upright post or tube 11 and is provided with a handle portion 46. Located within the handle member 45 is a double acting nipping lever 47, the end 48 of which extends out from the handle member 45 for manipulation purposes. The nipping lever 48 pivots about a shoulder 51 in the handle member and is provided at its inner end with a post 49 surrounded by a spring 50. The shoulder 51, post 49 and spring 50 operate in conjunction with the nipping lever 47 to prevent movement of the handle member 45 in either direction on the post 11, but when the nipping lever 47 is manipulated through its extension 48, the handle member 45 may be adjusted to any position along the post 11. Since the handle member 45 is locked against movement in the upward direction, it is therefore possible to apply tension to the flexible screen 31 afforded by the resilient means including the spring member 41.

Referring more particularly to FIGS. 5 to 7, a mechanism is provided for positively limiting the unrolling of the flexible screen 31 from its carrying roller, this mechanism affording two main functions, one function is to absolutely prevent tearing or separation of the screen from the roller and the other function is to cooperate with the tensioning means illustrated in FIG. 3 to provide for the tensioning of the flexible screen in picture exhibiting position, which is particularly useful in the exhibiting of three-dimensional pictures. In the arrangement of FIGS. 5 to 7, there is provided a post 55 having a flange 56 and a squared extension 57 which is secured against rotation to the end cap 35 of the screen case 30. A spacer member 58 having a squared hole 59 and a stationary stop bracket 60 having a squared hole 61, are carried by the squared extension 57 of the post 55. The stationary stop bracket 60 is provided with stop shoulders 62 and 63 extending radially outwardly therefrom. The spacer member 58 and the stop bracket 60 are rigidly secured between the flange 56 and the end cap 35 by peening over the end of the squared extension 57 where it extends through a squared hole in the end cap 35, the peening being illustrated at 64. Thus the post 55 and the stop bracket 60 are rigidly secured to the end cap 35 and hence to the screen case 30.

A bracket 66 having a central hole 67 is rotatably mounted on the post 55 and it is provided with a pair of longitudinally extending ears 68 and a radially extending ear 69. One end of a roller 70 is mounted over the ears 68 and against the ear 69 and is held in place on the bracket 66 by means of rivets 71. In this way this end of the roller 70 is mounted for rotation on the post 55. The other end of the roller 70 may be mounted for rotation and may be provided with spring means for rotating the roller 70 in a rolling direction in the manner illustrated and described in my aforementioned co-pending application. Preferably, the roller 70 is formed from an extruded tube having a shoulder 72 of a height substantially equal to the thickness of the flexible screen which is rolled on to the roller. The end of the flexible screen 31 is butted against this shoulder 72 and is suitably secured in place on the roller 70 by a suitable adhesive or the like. Due to this shoulder 72 and the butting of the flexible screen thereagainst, a smooth surface is at all times presented to subsequent layers of the flexible screen as it is rolled on the roller and, accordingly, any tendency to develop wrinkles or indentations in the screen is eliminated.

The bracket 66 is provided with an L-shaped extension 74 which, in turn, is provided with a slot 75. The end of the extension 74 is provided with a pair of ears 76 for supporting a pivot pin 77 which is arranged at right angles to the axis of rotation of the roller 70. A movable member or lever 78 is provided with a pair of ears 79 for pivotally mounting the member or lever 78 on the pin 77. One end of the lever 78 is provided with a finger 80 which is adapted to engage the shoulders 62 or 63 on the stop bracket 60 when the member or lever 78 is advanced as illustrated in solid lines in FIG. 5 and which is adapted to be swung or moved out of alignment with the shoulders 62 or 63 when the member or lever 78 is retracted, as illustrated in broken lines in FIG. 5. The other end of the member or lever 78 is provided with an operating finger 81 which is adapted to extend through a slot 83 in the roller 70 for engaging the flexible screen 31 when it is rolled on the roller 70. A spring 82 engaging the lever 78 and the extension 74 and wrapped around the pin 77 operates normally to urge the lever or member 78 to advanced position.

When the screen 31 is rolled upon the roller 70, the operating finger 81 is depressed by the screen to the position illustrated in broken lines in FIG. 5 and because of this the lever 78 is retracted against the action of the spring 82 so that the finger 80 is out of the path of the shoulders 62 or 63 on the stop bracket 60. This allows the flexible screen 31 to be unrolled from the roller 70 and withdrawn from the screen case 30. When, however, the screen is unrolled from the roller to uncover the slot 83, i.e. to the last turn, the the operating finger 81 of the lever 78 is released and the spring 82 then operates to advance the lever 78 so that its finger 80 is moved into alignment with the shoulders 62 or 63 of the stop bracket 60. As soon as the finger 80 engages one or the other of these shoulders 62 or 63, further rotation of the roller 70 in an unrolling direction is positively stopped. This, therefore, prevents complete unrolling of the screen from the roller and otherwise prevents tearing and separation of the screen from the roller. This positive stopping of the roller at this position also makes it possible to tension the flexible screen 31. Thus, when the flexible screen is withdrawn to picture exhibiting position wherein the screen is unrolled from the roller to uncover the slot i.e. to the last turn, the hook member 20 and the handle member 45 may be flexibly moved apart with respect to each other, and due to the action of the spring member 41, as illustrated in FIG. 3, tension is thereby applied to the flexible screen 31 to maintain it in a flat condition which is admirably suitable for the projection of three-dimension pictures.

Referring now to FIGS. 8 to 11, another form of mechanism is illustrated for accomplishing the same results as accomplished by the mechanism of FIGS. 5 to 7. Here, like reference characters have generally been utilized for like parts. The flexible screen 31 is secured to the roller 70 against the shoulder 72 in the manner described above. Arranged within the roller 70 is a U- shaped bracket 85 having end legs 86 and 87. The end leg 86 is provided with longitudinally extending ears 88 for securing the bracket 85 to the roller 70 as by means of rivets 89. The legs 86 and 87 are provided with holes for receiving a shaft 90 which is provided with a flange 92 for engaging the leg 86 and which is peened over at 91 adjacent the leg 87. In this way, the bracket 85 is secured to the shaft 90. The shaft 90 is provided with an extension 93 which is received in a hole in a bracket 109 which in turn is secured to the screen case. In this way, this end of the roller 70 is supported for rotation in the screen case and the other end of the roller 70 may be supported and spring actuated in the manner related above.

A member or lever 95 is provided with end portions 96 and 97 which in turn are provided with holes 98. A pin 99 extends through the holes 98 in the member or lever 95 and through holes in the end legs 86 and 87 of the bracket 85 for pivotally mounting the member or lever 95 on the bracket 85, the ends of the pin 99 being peened over as indicated at 100. Thus the member or lever 95 is pivotally mounted on the bracket 85 about an axis which is parallel to the axis of rotation of the roller 70. The member or lever 95 is provided with a slot 101 throughout its length so as to provide clearance for the shaft 90. The member or lever 95 is provided with an operating finger 103 which extends through a hole 104 in the roller 70 so as to contact the flexible screen 31 rolled on the roller 70. The end portion 97 of the lever 95 is provided with a stop finger 105 extending through an opening in the roller 70 which stop finger 105 is adapted to engage one or more stationary stop brackets 108 struck from the bracket 109. A spring 106 arranged about the pin 99 and engaging the bracket 85 and the lever 95 operates to advance the lever 95 to a position wherein the stop finger 105 engages the stop brackets 108. When, however, the flexible screen 31 is rolled upon the roller 70, the operating finger 103 of the lever 95 is engaged to move the lever 95 to a retracted position, as illustrated in FIG. 10, for the purpose of moving the stop finger 105 out of alignment with the stop brackets 108. Thus the screen 31 may be freely unrolled from the roller 70. When, however, the screen is unrolled to uncover the hole 104, i.e. to the last turn, the operating finger 103 is released to allow the spring 106 to advance the lever 95 to a position where the stop finger 105 is moved outwardly into alignment with the stop brackets 108. When the stop finger 105 engages the stop bracket 108, further unrolling of the screen 31 from the roller 70 is positively prevented. As a result, tearing and separation of the screen from the roller is prevented and tensioning of the screen, in the manner above described, is permitted. The purpose of utilizing two stop brackets 108 in the mechanism of FIGS. 8 to 11, and two stop brackets 62 and 63 in the mechanism of FIGS. 5 to 7, is to assure positive stopping of the rotation of the roller 70. If for some reason or other the stop fingers do not engage the first stop bracket, they will engage the second stop bracket, and in either event tearing or separation of the screen from the roller is absolutely prevented.

Another form of projection screen of this invention is generally designated at 110 in FIG. 12, this form of projection screen being of the wall mounted type wherein the flexible screen 31 is withdrawn downwardly from the screen case 112 by pulling on the slat 32. The screen case 112 may be suitably mounted on a wall or the like by a supporting member 111 and the screen case may be provided with suitable end caps 113. This form of the invention, in addition to providing mechanism for preventing tearing or separation of the flexible screen from the roller, also includes provision for holding the screen in withdrawn position. The details of the mechanism of the projection screen 110 are illustrated in FIGS. 13 to 19. Secured in the screen case 112 adjacent each end thereof are brackets 114 which are utilized for supporting the roller 115 within the screen case. At one end the roller 115 is provided with a bracket 116 which carries a pin 117 which is mounted in the adjacent bracket 114, this one end of the roller 115 thereby being supported for rotation within the screen case 112. Arranged at the other end of the screen case is a shaft 119 having a non-circular end 120 which is received in a non-circular opening in the other bracket 114. In this way the shaft 119 is secured against rotation with respect to the screen case 112. The shaft 119 adjacent the bracket 114 is provided with a collar 121 which, in turn, is provided with a stop shoulder 122. A U-shaped bracket 124 having leg portions 125 and 126 is arranged within the roller 115, the leg 126 being provided with longitudinally extending ears 127 which, in turn, are secured by rivets 128 to the roller 115. The leg portions 125 and 126 of the bracket 124 are provided with holes 129 for receiving the shaft 119 so that this end of the roller 115 is rotatably mounted on the shaft 119 and supported thereby. The leg portion 125 of the bracket 124 is provided with a pair of ears 130 struck therefrom and one end of a coil spring 131 is secured to these ears. The other end of the coil spring 131 is secured to a bracket 132 which, in turn, is secured by a rivet or the like 133 to the shaft 119. The inner end of the shaft 119 is rotatably mounted in a bracket 134 secured within the roller 115 so as to provide an inboard support for the inner end of the shaft 119. The spring 131 connected between the stationary shaft 119 and the bracket 124 secured to the roller 115 operates to rotate the roller 115 in a rolling direction.

A pawl 135 is pivotally mounted on the leg portion 126 of the bracket 124 by means of a pivot pin 136. This pawl has a shoulder 137 which is adapted to engage the shoulder 122 on the collar 121 when the pawl swings inwardly toward the axis of rotation of the roller 115. When the roller 115 is stationary or moving slowly, and the pawl is arranged above the collar 121, as illustrated in FIG. 19, the pawl 135 swings inwardly so that the shoulder 137 thereof engages the stop shoulder 122 on the collar 121. When this occurs, rotation of the roller 115 in a rolling direction by the spring 131 is prevented. When, however, the roller is rotated rapidly, the pawl 135 swings outwardly by centrifugal force so that its shoulder 137 does not engage the shoulder 122 on the collar 121, and under these conditions of rapid rotation the roller is rotated by the spring 131 to roll the screen 31 thereon. By reason of the pawl 135 and the stationary collar 121, the screen 31 may be withdrawn downwardly from the screen case 112 to picture exhibiting position, and then locked in that position. When it is desired to retract the flexible screen 31 into the screen case 112, the screen 31 is given a tug and allowed to retract rapidly into the screen case 112.

Arranged within the roller 115 and within the bracket 124 is a member or lever 139 having end portions 140 and 141 which, in turn, are provided with holes 142. A pin 143 extends through these holes 142 and is secured in the leg portions 125 and 126 of the bracket 124 for pivotally mounting the member or lever 139 to the bracket 124 and hence to the roller 115. The end portions of the lever 139 are provided with slots 144 for accommodating the shaft 119 to allow pivotal movement of the member or lever 139 about the pin 143 which is parallel to the axis of rotation of the roller 115. The member or lever 139 is provided with an operating finger 145 which is adapted to extend through an opening 146 in the roller 115 to engage the flexible screen 31 rolled upon the roller. The end 141 of the lever 139 is provided with a stop finger 147 which also extends through a suitable opening in the roller 115. A spring 148 arranged about the pin 143 and engaging the shaft 119 and the lever 139, operates to advance the lever 139 to a position where the stop finger 147 is in alignment with a stop bracket 149 secured by rivets 150 to the stationary bracket 114 and hence to the screen case 112.

When the screen is rolled upon the roller 115, it engages the operating finger 145, as illustrated in FIG. 19 to retract the lever 139 against the action of the spring 148 to move the stop finger 147 out of alignment with the stop bracket 149. Thus, the roller 115 may be freely rotated in the unrolling direction against the action of the spring 131 to allow downward withdrawal of the flexible screen 31 from the screen case 112. When the flexible screen 31 is unrolled to uncover the opening i.e. to the last turn, the operating finger 145 of the lever 139 is released, whereupon the spring 148 moves the lever 139 to its advanced position where the stop finger 147 is moved into alignment with the stop bracket 149 as indicated in FIG. 18. When the stop finger 147 engages the stop bracket 149, further rotation of the roller 115 is prevented to positively prevent tearing or separation of the flexible screen 31 from the roller 115. The roller is then allowed to rotate slowly in a rolling direction until the shoulder 137 of the pawl 135 engages the stop shoulder 122 on the collar 121 whereupon rolling rotation of the roller is stopped and the screen is maintained in picture exhibiting position. It is noted that at least substantially 180° of rotation of the roller is provided between the point where the stop finger 147 engages the stop bracket 149 and the point where the stop shoulder 137 of the pawl 135 engages the stop shoulder 122 on the collar 121. This is to allow sufficient rotation of the roller in the unrolling direction to permit rapid rolling of the roller in the rolling direction so that, when it is desired to retract the screen into the screen case, the shoulder 137 of the pawl 135 will not engage the stop shoulder 122 on the collar 121. This relationship of these parts assures correlated operations of the stop mechanisms which limit unrolling of the screen and which permits controlled rolling of the screen on the roller. By mounting the pawl 135 on the same bracket 124 which pivotally carries the lever 139, these angular relations may be positively determined.

In all forms of the invention herein disclosed there are provided cooperating members carried by the screen case and roller, which members are positioned with respect to each other by the screen on the roller to allow unrolling of the screen from the roller to picture exhibiting position until the screen is unrolled to uncover the opening in the roller, i.e. to the last turn and then to stop further unrolling of the screen from the roller whereby tearing and separation of the screen from the roller are entirely eliminated. In the form of the invention contemplated in FIG. 3, this mechanism for limiting the unrolling of the screen from the roller also cooperates with the tensioning means associated with the suspension slat for providing a simple and effective arrangement for tensioning the screen so as to make it particularly adaptable for use in exhibiting three-dimensional pictures. In the form of the invention contemplated in FIGS. 12 to 19, this mechanism for limiting the unrolling of the screen from the roller operates in conjunction with other cooperating members carried by the screen case and roller, which prevent slow rotation of the roller in the rolling direction but permit rapid rotation of the roller in the rolling direction for the purpose of maintaining the screen in picture exhibiting position, this being particularly desirable in a projection screen of the wall mounting type. In one form of the invention, particularly as contemplated in FIGS. 5 to 7, the pivoted lever which limits the rotation of the roller in the unrolling direction, pivots about an axis which is at right angles to the axis of rotation of the roller, while in the other forms of the invention, as for example contemplated in FIGS. 8 to 19, the pivoted lever is pivoted about an axis which is parallel to the axis of rotation of the roller.

While for purposes of illustration, several forms of this invention have been disclosed, other forms thereof may become apparent to those skilled in the art upon reference to this disclosure and therefore this invention is to be limited only by the scope of the appended claims.

I claim as my invention:

1. In a projection screen for use in exhibiting pictures and having a screen case, a spring actuated hollow roller rotatably mounted in the screen case, a flexible screen secured at one end to the roller and being automatically rolled thereon and adapted to be unrolled therefrom to picture exhibiting position, the improvement comprising, the hollow roller having a hole therein which is normally covered by the screen but which is uncovered when the screen is unrolled to picture exhibiting position, a stationary stop bracket carried by the screen case, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller to picture exhibiting position until the screen is unrolled to uncover the hole in the roller to release the operating finger for allowing the spring means to advance the member to stop further unrolling of the screen from the roller.

2. In a projection screen for use in exhibiting pictures and having a screen case, a spring actuated hollow roller rotatably mounted in the screen case, a flexible screen secured at one end to the roller and being automatically rolled thereon and adapted to be unrolled therefrom to picture exhibiting position, the improvement comprising, the hollow roller having a hole therein which is normally covered by the screen but which is uncovered when the screen is unrolled to picture exhibiting position, a stationary stop bracket carried by the screen case, a lever located within the hollow roller and pivotally mounted on the roller and movable between an advanced and retracted position, spring means urging the lever to advanced position, a stop finger on said lever which extends from within the roller and which engages the stationary stop bracket when the lever is advanced to prevent further rotation of the roller in the unrolling direction, and an operating finger on said lever which extends through the hole in the roller and which is engaged by the screen covering the hole in the roller to retract the lever against the action of the spring means to allow unrolling of the screen from the roller to picture exhibiting position until the screen is unrolled to uncover the hole in the roller to release the operating finger for allowing the spring means to advance the lever to stop further unrolling of the screen from the roller.

3. In a projection screen for use in exhibiting pictures and having a screen case, a spring actuated hollow roller rotatably mounted in the screen case, a flexible screen secured at one end to the roller and being automatically rolled thereon and adapted to be unrolled therefrom to picture exhibiting position, the improvement comprising, the hollow roller having a hole therein which is normally covered by the screen but which is uncovered when the screen is unrolled to picture exhibiting position, a stationary stop bracket carried by the screen case, a lever located within the hollow roller and pivotally mounted on the roller about a pivot axis at right angles to the axis of rotation of the roller and movable between an advanced and retracted position, spring means urging the lever to advanced position, a stop finger on said lever which extends from within the roller and which engages the stationary stop bracket when the lever is advanced to prevent further rotation of the roller in the unrolling direction, and an operating finger on said lever which extends through the hole in the roller and which is engaged by the screen covering the hole in the roller to retract the lever against the action of the spring means to allow unrolling of the screen from the roller to picture exhibiting position until the screen is unrolled to uncover the hole in the roller to release the operating finger for allowing the spring means to advance the lever to stop further unrolling of the screen from the roller.

4. In a projection screen for use in exhibiting pictures and having a screen case, a spring actuated hollow roller rotatably mounted in the screen case, a flexible screen secured at one end to the roller and being automatically rolled thereon and adapted to be unrolled therefrom to picture exhibiting position, the improvement comprising, the hollow roller having a hole therein which is normally covered by the screen but which is uncovered when the screen is unrolled to picture exhibiting position, a stationary stop bracket carried by the screen case, a lever located within the hollow roller and pivotally mounted on the roller about a pivot axis parallel to the axis of rotation of the roller and movable between an advanced and retracted position, spring means urging the lever to advanced position, a stop finger on said lever which extends from within the roller and which engages the stationary stop bracket when the lever is advanced to prevent further rotation of the roller in the unrolling direction, and an operating finger on said lever which extends through the hole in the roller and which is engaged by the screen covering the hole in the roller to retract the lever against the action of the spring means to allow unrolling of the screen from the roller to picture exhibiting position until the screen is unrolled to uncover the hole in the roller to release the operating finger for allowing the spring means to advance the lever to stop further unrolling of the screen from the roller.

5. In a projection screen for use in exhibiting pictures and having a screen case, a spring actuated hollow roller rotatably mounted in the screen case, a flexible screen secured at one end to the roller and being automatically rolled thereon and adapted to be unrolled therefrom to picture exhibiting position, the improvement comprising, a stop shoulder stationarily carried by the screen case, a pawl movably mounted on the roller and movable between advanced and retracted positions and having a shoulder engaging the stop shoulder when the pawl is in retracted position to prevent rotation of the roller in the rolling direction, said pawl being movable to its advanced position by centrifugal force when the roller is rapidly rotated to allow rotation of the roller in the rolling direction, the hollow roller having a hole therein which is normally covered by the screen but which is uncovered when the screen is unrolled to picture exhibiting position, a stationary stop bracket carried by the screen case, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller to picture exhibiting position until the screen is unrolled to uncover the hole in the roller to release the operating finger for allowing the spring means to advance the member to stop further unrolling of the screen from the roller.

6. In a projection screen for use in exhibiting pictures and having a screen case, a spring actuated hollow roller rotatably mounted in the screen case, a flexible screen secured at one end to the roller and being automatically rolled thereon and adapted to be unrolled therefrom to picture exhibiting position, the improvement comprising, a stop shoulder stationarily carried by the screen case, a pawl movably mounted on the roller and movable between advanced and retracted positions and having a shoulder engaging the stop shoulder when the pawl is in retracted position to prevent rotation of the roller in the rolling direction, said pawl being movable to its advanced position by centrifugal force when the roller is rapidly rotated to allow rotation of the roller in the rolling direction, the hollow roller having a hole therein which is normally covered by the screen but which is uncovered when the screen is unrolled to picture exhibiting position, a stationary stop bracket carried by the screen case, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller to picture exhibiting position until the screen is unrolled to uncover the hole in the roller to release the operating finger for allowing the spring means to advance the member to stop further unrolling of the screen from the roller, the angular relations with respect to the axis of rotation of the roller between the stop shoulder and pawl and the stationary stop and movable member being such as to permit rapid rotation of the roller in a rolling direction from a position where the screen is unrolled to picture exhibiting position and stopped.

7. In a projection screen for use in exhibiting pictures and having a supporting stand, a screen case carried by the supporting stand, a spring actuated hollow roller rotatably mounted in the screen case, a flexible screen secured at one end to the roller and being automatically rolled thereon and adapted to be unrolled therefrom to picture exhibiting position and having a suspension slat at its other end, and a hook member carried by the stand and spaced from the screen, the improvement comprising, the hollow roller having a hole therein which is normally covered by the screen but which is uncovered when the screen is unrolled to picture exhibiting position, means including resilient means for releasably securing the suspension slat to the hook member for extending the screen to picture exhibiting position, a stationary stop bracket carried by the screen case, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller to picture exhibiting position until the screen is unrolled to uncover the hole in the roller to release the operating finger for allowing the spring means to advance the member to stop further unrolling of the screen from the roller, and means for moving apart and locking the hook member and screen case for tensioning the resilient means to tension the screen in picture exhibiting position.

8. A supporting device, a spring actuated hollow roller rotatably mounted on the supporting device, a flexible screen secured at one end to the roller and being automatically rolled thereon and adapted to be unrolled therefrom, the hollow roller having a hole therein which is normally covered by the screen but which is uncovered when the screen is unrolled to picture exhibiting position, a stationary stop bracket carried by the supporting device, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller until the screen is unrolled to uncover the hole in the roller to release the operating finger for allowing the spring means to advance the member to stop further unrolling of the screen from the roller.

9. A supporting device, a spring actuated hollow roller rotatably mounted on the supporting device, a flexible screen secured at one end to the roller and being automatically rolled thereon and adapted to be unrolled therefrom, a stop shoulder stationarily carried by the supporting device, a pawl movably mounted on the roller and movable between advanced and retracted positions and having a shoulder engaging the stop shoulder when the pawl is in retracted position to prevent rotation of the roller in the rolling direction, said pawl being movable to its advanced position by centrifugal force when the roller is rapidly rotated to allow rotation of the roller in the rolling direction, the hollow roller having a hole therein which is normally covered by the screen but which is uncovered when the screen is unrolled to picture exhibiting position, a stationary stop bracket carried by the supporting device, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller until the screen is unrolled to uncover the hole in the roller to release the operating finger for allowing the spring means to advance the member to stop further unrolling of the screen from the roller.

10. A supporting device, a spring actuated hollow roller rotatably mounted on the supporting device, a flexible screen secured at one end to the roller and being automatically rolled thereon and adapted to be unrolled therefrom, a stop shoulder stationarily carried by the supporting device, a pawl movably mounted on the roller and movable between advanced and retracted positions and having a shoulder engaging the stop shoulder when the pawl is in retracted position to prevent rotation of the roller in the rolling direction, said pawl being movable to its advanced position by centrifugal force when the roller is rapidly rotated to allow rotation of the roller in the rolling direction, the hollow roller having a hole therein which is normally covered by the screen but which is uncovered when the screen is unrolled to picture exhibiting position, a stationary stop bracket carried by the supporting device, a member located within the hollow roller and movably mounted on the roller and movable between an advanced and retracted position, spring means urging the member to advanced position, a stop finger on said member which extends from within the roller and which engages the stationary stop bracket when the member is advanced to prevent further rotation of the roller in the unrolling direction, and an operating finger on said member which extends through the hole in the roller and which is engaged by the screen covering the hole in the roller to retract the member against the action of the spring means to allow unrolling of the screen from the roller until the screen is unrolled to uncover the hole in the roller to release the operating finger for allowing the spring means to advance the member to stop further unrolling of the screen from the roller, the angular relations with respect to the axis of rotation of the roller between the stop shoulder and pawl and the stationary stop and movable member being such as to permit rapid rotation of the roller in a rolling direction from a position where the screen is unrolled to picture exhibiting position and stopped.

11. In a projection screen for use in exhibiting pictures and having a supporting stand, a screen case carried by the supporting stand, a spring actuated hollow roller rotatably mounted in the screen case, a flexible screen secured at one end to the roller and being automatically rolled thereon and adapted to be unrolled therefrom to picture exhibiting position and having a suspension slat at its other end, and a hook member carried by the stand and spaced from the screen, the improvement comprising, means including resilient means for releasably securing the suspension slat to the hook member for extending the screen to picture exhibiting position, the hollow roller having a hole therein which is normally covered by the screen but which is uncovered when the screen is unrolled to picture exhibiting position, a stationary stop bracket carried by the screen case, a lever located within the hollow roller and pivotally mounted on the roller and movable between an advanced and retracted position, spring means urging the lever to advanced position, a stop finger on said lever which extends from within the hollow roller and which engages the stationary stop bracket when the lever is advanced to prevent further rotation of the roller in the unrolling direction, and an operating finger on said lever which extends through the hole in the roller and which is engaged by the screen covering the hole in the roller to retract the lever against the action of the spring means to allow unrolling of the screen from the roller to picture exhibiting position until the screen is unrolled to uncover the hole in the roller to release the operating finger for allowing the spring means to advance the lever to stop further unrolling of the screen from the roller, and means for moving apart and locking the hook member and screen case for tensioning the resilient means to tension the screen in picture exhibiting position.

12. In a projection screen for use in exhibiting pictures and having a supporting stand, a screen case carried by the supporting stand, a spring actuated hollow roller rotatably mounted in the screen case, a flexible screen secured at one end to be unrolled therefrom to picture exhibiting position and having a suspension slat at its other end, and a hook member carried by the stand and spaced from the screen, the improvement comprising, means including resilient means for releasably securing the suspension slat to the hook member for extending the screen to picture exhibiting position, the hollow roller having a hole therein which is normally covered by the screen but which is uncovered when the screen is unrolled to picture exhibiting position, a stationary stop bracket carried by the screen case, a lever located within the hollow roller and pivotally mounted on the roller about a pivot axis at right angles to the axis of rotation of the roller and movable between an advanced and retracted position, spring means urging the lever to advanced position, a stop finger on said lever which extends from within the hollow roller and which engages the stationary stop bracket when the lever is advanced to prevent further rotation of the roller in the unrolling direction, and an operating finger on said lever which extends through the hole in the roller and which is engaged by the screen covering the hole in the roller to retract the lever against the action of the spring means to allow unrolling of the screen from the roller to picture exhibiting position until the screen is unrolled to uncover the hole in the roller to release the operating finger for allowing the spring means to advance the lever to stop further unrolling of the screen from the roller, and means for moving apart and locking the hook member and screen case for tensioning and resilient means to tension the screen in picture exhibiting position.

13. In a projection screen for use in exhibiting pictures and having a supporting stand, a screen case carried by the screen case, a flexible screen secured at one end to the roller and being automatically rolled thereon and adapted to be unrolled therefrom to picture exhibiting position and having a suspension slat at its other end, and a hook member carried by the stand and spaced from the screen, the improvement comprising, means including resilient means for releasably securing the suspension slat to the hook member for extending the screen to picture exhibiting position, the hollow roller having a hole therein which is normally covered by the screen but which is uncovered when the screen is unrolled to picture exhibiting position, a stationary stop bracket carried by the screen case, a lever located within the hollow roller and pivotally mounted on the roller about a pivot axis parallel to the axis of rotation of the roller and movable between an advanced and retracted position, spring means urging the lever to advanced position, a stop finger on said lever which extends from within the hollow roller and which engages the stationary stop bracket when the lever is advanced to prevent further rotation of the roller in the unrolling direction, and an operating finger on said lever which extends through the hole in the roller and which is engaged by the screen covering the hole in the roller to retract the lever against the action of the spring means to allow unrolling of the screen from the roller to picture exhibiting position until the screen is unrolled to uncover the hole in the roller to release the operating finger for allowing the spring means to advance the lever to stop further unrolling of the screen from the roller, and means for moving apart and locking the hook member and screen case for tensioning the resilient means to tension the screen in picture exhibiting position.

References Cited in the file of this patent

UNITED STATES PATENTS

| 513,783 | Hartshorn | Jan. 30, 1894 |
| 764,516 | Bell | July 5, 1904 |
| 769,925 | Wageley | Sept. 13, 1904 |
| 1,147,834 | Whitmore | July 27, 1915 |
| 1,946,639 | Riddell | Feb. 13, 1934 |
| 1,981,444 | Wittel | Nov. 20, 1934 |
| 2,696,249 | Prokop et al. | Dec. 7, 1954 |
| 2,793,687 | Petrick | May 28, 1957 |

FOREIGN PATENTS

| 915,384 | Germany | July 22, 1954 |